US006512601B1

(12) United States Patent
Edgar

(10) Patent No.: US 6,512,601 B1
(45) Date of Patent: Jan. 28, 2003

(54) PROGRESSIVE AREA SCAN IN ELECTRONIC FILM DEVELOPMENT

(75) Inventor: Albert D. Edgar, Austin, TX (US)

(73) Assignee: Applied Science Fiction, Inc., Austin, TX (US)

( * ) Notice: Subject to any disclaimer, the term of this patent is extended or adjusted under 35 U.S.C. 154(b) by 0 days.

(21) Appl. No.: 09/255,400

(22) Filed: Feb. 22, 1999

Related U.S. Application Data
(60) Provisional application No. 60/075,573, filed on Feb. 23, 1998.

(51) Int. Cl.$^7$ ................................................. H04N 1/04
(52) U.S. Cl. ....................................... 358/487; 358/471
(58) Field of Search ................................. 358/487, 505, 358/538, 453, 471, 486

(56) References Cited

U.S. PATENT DOCUMENTS

| | | | | |
|---|---|---|---|---|
| 2,404,138 A | 7/1946 | Mayer | ............................. | 95/94 |
| 3,520,689 A | 7/1970 | Nagae et al. | ................... | 96/55 |
| 3,520,690 A | 7/1970 | Nagae et al. | ................... | 96/55 |
| 3,587,435 A | 6/1971 | Chioffe | ............................ | 95/89 |
| 3,615,479 A | 10/1971 | Kohler et al. | ................... | 96/48 |
| 3,615,498 A | 10/1971 | Aral | ............................... | 96/55 |

(List continued on next page.)

FOREIGN PATENT DOCUMENTS

| | | | | |
|---|---|---|---|---|
| EP | 0 261 782 A2 | 8/1987 | ............ | H04N/1/46 |
| EP | 0 422 220 A1 | 3/1989 | ............ | A61B/6/03 |
| EP | 0 482 790 B1 | 9/1991 | ............ | H04N/1/40 |
| EP | 0 525 886 A3 | 7/1992 | ............ | G03D/5/00 |
| EP | 0 580 293 A1 | 6/1993 | ............ | H04N/1/04 |
| EP | 0 580 293 A1 * | 1/1994 | ............ | H04N/1/04 |

(List continued on next page.)

OTHER PUBLICATIONS

"Adaptive Fourier Threshold Filtering: A Method to Reduce Noise and Incoherent Artifacts in High Resolution Cardiac Images", Doyle, M., et al., 8306 Magnetic Resonance in Medicine 31, No. 5, Baltimore, MD, May, pp. 546–550, 1994.

"Anisotropic Spectral Magnitude Estimation Filters for Noise Reduction and Image Enhancement", Aich, T., et al., Philips GmbH Research Laboratories, IEEE, pp. 335–338, 1996.

"Adaptive–neighborhood filtering of images corrupted by signal–dependent noise", Rangayyan, R., et al., Applied Optics, vol. 37, No. 20, pp. 4477–4487, Jul. 10, 1998.

"Grayside Characteristics", The Nature of Color Images, Photographic Negatives, pp. 163–168.

"Parallel Production of Oligonucleotide Arrays Using Membranes and Reagent Jet Printing", Stimpson, D., et al., Research Reports, BioTechniques, vol. 25, No. 5, pp. 886–890, 1998.

"Low–Cost Display Assembly and Interconnect Using Ink–Jet Printing Technology", Hayes, D. et al., Display Works '99, MicroFab Technologies, Inc., pp. 1–4, 1999.

(List continued on next page.)

Primary Examiner—Jerome Grant, II
(74) Attorney, Agent, or Firm—Dinsmore & Shohl LLP

(57) ABSTRACT

During electronic film development, an area of conventional photographic film is scanned several times using a single scanning station, and at each subsequent time this scanned area is advanced incrementally along the film with multiple levels of overlap with previous scans. The new image scanned at each new time is aligned to an accumulating image that has been extrapolated to the image at the new time, and then the new image is added to the accumulating image in parametric summations that allow an image to be interpolated to any time free of seams where the scans overlap. The invention further teaches a method of steering the alignment by warping the leading edge of the alignment, and a registration method of aligning multiple images that takes advantage of known fixed alignments between images.

27 Claims, 7 Drawing Sheets

U.S. PATENT DOCUMENTS

| | | | |
|---|---|---|---|
| 3,617,282 A | 11/1971 | Bard | 96/59 |
| 3,747,120 A | 7/1973 | Stemme | 346/75 |
| 3,833,161 A * | 9/1974 | Krumbein | 226/92 |
| 3,903,541 A | 9/1975 | Von Meister et al. | 354/317 |
| 3,946,398 A | 3/1976 | Kyser et al. | 346/1 |
| 3,959,048 A | 5/1976 | Stanfield et al. | 156/94 |
| 4,026,756 A | 5/1977 | Stanfield et al. | 156/554 |
| 4,081,577 A | 3/1978 | Horner | 427/424 |
| 4,142,107 A | 2/1979 | Hatzakis et al. | 250/571 |
| 4,215,927 A | 8/1980 | Grant et al. | 354/317 |
| 4,249,985 A | 2/1981 | Stanfield | 156/554 |
| 4,265,545 A * | 5/1981 | Slaker | 356/431 |
| 4,301,469 A | 11/1981 | Modeen et al. | 358/75 |
| 4,490,729 A | 12/1984 | Clark et al. | 346/75 |
| 4,501,480 A | 2/1985 | Matsui et al. | 354/298 |
| 4,564,280 A | 1/1986 | Fukuda | 354/317 |
| 4,594,598 A | 6/1986 | Iwagami | 346/140 |
| 4,621,037 A | 11/1986 | Kanda et al. | 430/30 |
| 4,623,236 A | 11/1986 | Stella | 354/318 |
| 4,633,300 A * | 12/1986 | Sakai | 358/41 |
| 4,636,808 A | 1/1987 | Herron | 346/75 |
| 4,666,307 A | 5/1987 | Matsumoto et al. | 356/404 |
| 4,670,779 A | 6/1987 | Nagano | 358/75 |
| 4,736,221 A | 4/1988 | Shidara | 354/317 |
| 4,741,621 A * | 5/1988 | Taft et al. | 356/376 |
| 4,745,040 A | 5/1988 | Levine | 430/21 |
| 4,755,844 A | 7/1988 | Tsuchiya et al. | 354/317 |
| 4,777,102 A | 10/1988 | Levine | 430/21 |
| 4,796,061 A | 1/1989 | Ikeda et al. | 355/73 |
| 4,814,630 A | 3/1989 | Lim | 250/578 |
| 4,821,114 A | 4/1989 | Gebhardt | 358/75 |
| 4,845,551 A | 7/1989 | Matsumoto | 358/80 |
| 4,851,311 A | 7/1989 | Millis et al. | 430/30 |
| 4,857,430 A | 8/1989 | Millis et al. | 430/30 |
| 4,875,067 A | 10/1989 | Kanzaki et al. | 354/325 |
| 4,884,224 A * | 11/1989 | Hirosawa | 364/550 |
| 4,969,045 A | 11/1990 | Haruki et al. | 358/228 |
| 4,994,918 A | 2/1991 | Lingemann | 358/214 |
| 5,018,177 A * | 5/1991 | McDavid | 378/62 |
| 5,027,146 A * | 6/1991 | Manico et al. | 354/299 |
| 5,034,767 A | 7/1991 | Netz et al. | 354/317 |
| 5,036,545 A * | 7/1991 | Iida | 382/62 |
| 5,101,286 A | 3/1992 | Patton | 358/487 |
| 5,124,216 A | 6/1992 | Giapis et al. | 430/30 |
| 5,155,596 A | 10/1992 | Kurtz et al. | 358/214 |
| 5,196,285 A | 3/1993 | Thomson | 430/30 |
| 5,200,817 A * | 4/1993 | Birnbaum | 358/80 |
| 5,212,512 A | 5/1993 | Shiota | 354/319 |
| 5,231,439 A | 7/1993 | Takahashi et al. | 354/313 |
| 5,235,352 A | 8/1993 | Pies et al. | 346/140 |
| 5,255,408 A | 10/1993 | Blackman | 15/308 |
| 5,266,805 A | 11/1993 | Edgar | 250/330 |
| 5,267,030 A | 11/1993 | Giorgianni et al. | 358/527 |
| 5,292,605 A | 3/1994 | Thomson | 430/30 |
| 5,296,923 A | 3/1994 | Hung | 358/527 |
| 5,334,247 A * | 8/1994 | Columbus et al. | 118/411 |
| 5,350,651 A | 9/1994 | Evans et al. | 430/21 |
| 5,350,664 A | 9/1994 | Simons | 430/362 |
| 5,357,307 A | 10/1994 | Glanville et al. | 354/324 |
| 5,360,701 A | 11/1994 | Elton et al. | 430/501 |
| 5,371,542 A | 12/1994 | Pauli et al. | 348/262 |
| 5,391,443 A | 2/1995 | Simons et al. | 430/21 |
| 5,414,779 A | 5/1995 | Mitch | 382/199 |
| 5,416,550 A | 5/1995 | Skye et al. | 354/298 |
| 5,418,119 A | 5/1995 | Simons | 430/507 |
| 5,418,597 A | 5/1995 | Lahcanski et al. | 355/76 |
| 5,432,579 A | 7/1995 | Tokuda | 354/293 |
| 5,436,738 A | 7/1995 | Manico | 358/503 |
| 5,440,365 A | 8/1995 | Gates et al. | 354/298 |
| 5,447,811 A | 9/1995 | Buhr et al. | 430/20 |
| 5,448,380 A | 9/1995 | Park | 358/520 |
| 5,452,018 A | 9/1995 | Capitant et al. | 348/651 |
| 5,465,155 A | 11/1995 | Edgar | 358/500 |
| 5,465,163 A | 11/1995 | Yoshihara et al. | 358/444 |
| 5,477,345 A * | 12/1995 | Tse | 358/500 |
| 5,496,669 A | 3/1996 | Pforr et al. | 430/22 |
| 5,502,541 A * | 3/1996 | Olliver | 355/38 |
| 5,516,608 A | 5/1996 | Hobbs et al. | 430/30 |
| 5,519,510 A | 5/1996 | Edgar | 358/471 |
| 5,546,477 A | 8/1996 | Knowles et al. | 382/242 |
| 5,550,566 A | 8/1996 | Hodgson et al. | 345/202 |
| 5,552,904 A | 9/1996 | Ryoo et al. | 358/518 |
| 5,563,717 A | 10/1996 | Koeng et al. | 358/406 |
| 5,568,270 A | 10/1996 | Endo | 358/298 |
| 5,576,836 A | 11/1996 | Sano et al. | 358/302 |
| 5,581,376 A | 12/1996 | Harrington | 358/518 |
| 5,587,752 A * | 12/1996 | Petruchik | 396/315 |
| 5,596,415 A | 1/1997 | Cosgrove et al. | 358/296 |
| 5,627,016 A | 5/1997 | Manico | 430/434 |
| 5,649,260 A * | 7/1997 | Wheeler et al. | 396/569 |
| 5,664,253 A | 9/1997 | Mevers | 396/603 |
| 5,664,255 A | 9/1997 | Wen | 396/627 |
| 5,667,944 A | 9/1997 | Reem et al. | 430/359 |
| 5,678,116 A | 10/1997 | Sugimoto et al. | 396/611 |
| 5,691,118 A | 11/1997 | Haye | 430/357 |
| 5,695,914 A | 12/1997 | Simon et al. | 430/379 |
| 5,698,382 A | 12/1997 | Nakahanada et al. | 430/418 |
| 5,726,773 A | 3/1998 | Mehlo et al. | 358/474 |
| 5,739,897 A | 4/1998 | Frick et al. | 355/40 |
| 5,745,217 A * | 4/1998 | Factor | 355/40 |
| 5,771,107 A | 6/1998 | Fujimoto et al. | 358/464 |
| 5,790,277 A | 8/1998 | Edgar | 358/487 |
| 5,835,795 A * | 11/1998 | Craig et al. | 396/6 |
| 5,835,811 A | 11/1998 | Tsumura | 396/598 |
| 5,870,172 A | 2/1999 | Blume | 355/27 |
| 5,880,819 A | 3/1999 | Tanaka et al. | 355/75 |
| 5,892,595 A | 4/1999 | Yamakawa et al. | 358/530 |
| 5,930,388 A | 7/1999 | Murakami et al. | 382/167 |
| 5,943,090 A * | 8/1999 | Eiberger | 348/97 |
| 5,959,720 A * | 9/1999 | Kwon et al. | 355/38 |
| 5,963,662 A | 10/1999 | Vachtsevanos et al. | 382/150 |
| 5,966,465 A | 10/1999 | Keith et al. | 382/232 |
| 5,979,011 A | 11/1999 | Miyawaki et al. | 15/308 |
| 5,982,936 A | 11/1999 | Tucker et al. | 382/233 |
| 5,982,937 A | 11/1999 | Accad | 382/239 |
| 5,982,941 A | 11/1999 | Loveridge et al. | 382/260 |
| 5,982,951 A | 11/1999 | Katayama et al. | 382/284 |
| 5,988,896 A | 11/1999 | Edgar | 396/604 |
| 5,991,444 A | 11/1999 | Burt et al. | 382/232 |
| 5,998,109 A | 12/1999 | Hirabayashi | 430/434 |
| 6,000,284 A | 12/1999 | Shin et al. | 73/150 |
| 6,005,987 A | 12/1999 | Nakamura et al. | 382/294 |
| 6,065,824 A | 5/2000 | Bullock et al. | 347/19 |
| 6,069,714 A | 5/2000 | Edgar | 358/487 |
| 6,088,084 A * | 7/2000 | Nishio | 355/75 |
| 6,089,687 A | 7/2000 | Helterline | 347/7 |
| 6,101,273 A | 8/2000 | Matama | 382/169 |
| 6,102,508 A | 8/2000 | Cowger | 347/7 |
| 6,137,965 A | 10/2000 | Burgeios et al. | 396/626 |
| 6,200,738 B1 * | 3/2001 | Takano et al. | 430/362 |

FOREIGN PATENT DOCUMENTS

| | | | | |
|---|---|---|---|---|
| EP | 0580293 | | 1/1994 | H04N/1/04 |
| EP | 0 601 364 A1 * | | 6/1994 | H04N/1/387 |
| EP | 0 669 753 A2 | | 2/1995 | H04N/1/407 |
| EP | 0 794 454 A2 | | 2/1997 | G03B/27/73 |
| EP | 0 768 571 A2 * | | 4/1997 | G03D/13/00 |
| EP | 0 806 861 A1 * | | 11/1997 | H04N/1/00 |
| EP | 0 878 777 A2 * | | 11/1998 | G06T/5/40 |
| EP | 0 930 498 A2 | | 12/1998 | G01N/21/88 |
| WO | WO 90/01240 | | 2/1990 | H04N/1/40 |

| WO | WO 91/09493 | | 6/1991 | H04N/5/217 |
| --- | --- | --- | --- | --- |
| WO | WO 97/25652 | | 7/1997 | G03D/5/00 |
| WO | WO 98/19216 | | 5/1998 | G03D/5/29 |
| WO | WO 98/25399 | | 6/1998 | H04N/1/38 |
| WO | WO 98/31142 | | 7/1998 | H04N/5/253 |
| WO | WO 93/34157 | | 8/1998 | |
| WO | WO 98/34157 | * | 8/1998 | |
| WO | WO 98/34397 | | 8/1998 | |
| WO | WO 99/43148 | | 8/1999 | H04N/1/00 |
| WO | WO 99/43149 | * | 8/1999 | H04N/1/100 |
| WO | WO 01/01197 | | 1/2001 | G03D/5/00 |
| WO | WO 01/13174 A1 | | 2/2001 | G03D/5/06 |
| WO | WO 01/45042 A1 | * | 6/2001 | G06T/5/00 |
| WO | WO 01/50192 A1 | * | 7/2001 | G03C/7/407 |
| WO | WO 01/50193 A1 | * | 7/2001 | G03C/7/407 |
| WO | WO 01/50194 A1 | * | 7/2001 | G03C/7/407 |
| WO | WO 01/50197 A1 | * | 7/2001 | G03G/7/42 |
| WO | WO 01/52556 A2 | * | 7/2001 | H04N/9/11 |

OTHER PUBLICATIONS

"Ink–Jet Based Fluid Microdispensing in Biochemical Applications", Wallace, D., MicroFab Technologies, Inc., Laboratory Automation News, vol. 1, No. 5, pp. 6–9, Nov., 1996.

"Protorealistic Ink–Jet Printing Through Dynamic Spot Size Control", Wallace, D., Journal of Imaging Science and Technology, vol. 40, No. 5, pp. 390–395, Sep./Oct. 1996.

"MicroJet Printing of Solder and Polymers for Multi–Chip Modules and Chip–Scale Package", Hayes, D., et al., Micro-Fab Technologies, Inc.

"A Method of Characterisstics Model of a Drop–on–Demand Ink–Jet Device Using an Integral Method Drop Formation Model", Wallace, D., MicroFab Technologies, Inc., The American Society of Mechanical Engineers, Winter Annual Meeting, pp. 1–9, Dec. 10–15, 1989.

"Digital Imaging Equipment White Papers", Putting Damaged Film on ICE, www.nikonusa.com/reference/whitepapers/imaging, Nikon Corporation, Nov. 28, 2000.

* cited by examiner

PROGRESSIVE AREA SCAN IN ELECTRONIC FILM DEVELOPMENT

Reference is hereby made to U.S. Provisional Application U.S. Serial No. 60/075,573 filed Feb. 23, 1998. The priority date of Feb. 23, 1998 is hereby claimed.

BACKGROUND

Electronic film development is a process in which conventional silver halide film is electronically scanned during the actual development process, rather than waiting, as in the common art, until development is finished. Electronic film development is taught in U.S. Pat. No. 5,519,510 issued to the present inventor.

With electronic film development it is possible to build a history of the emerging image through different phases of development. Early in development, highlights reveal the greatest clarity. Conventional development would proceed past this point into total darkness, but by capturing the image at this time, highlight details that would normally be lost are saved. Conversely, conventional development would end development at the optimum compromise point. But by developing past that time and continuing to capture the image during continued development, image details that would normally be lost can be coaxed from the shadows.

Thus, one key to electronic film development is the ability to capture images of the same piece of film at different development times and to later merge these images into one image with more detail than in conventional development. This merging is called "stitching". In the prior art, stitching was performed by effectively cutting out and aligning parts of the different development time images, and pasting those image fragments back together.

This system is capable of coping with variations or jumps in sample times that would confuse the prior art method of stitching. For example, if all the samples were made 30 seconds later, but all the densities were proportionately higher, the same continuous curve would of course be described without special corrections required to make individually captured image densities coalign.

Additional background art is described in U.S. Pat. No. 5,465,155 developed by Al Edgar. This known process extends electronic film development to tricolor image capture. In duplex film scanning, a conventional multilayer color film is scanned during development in three ways: by reflected light from the back, by reflected light from the front, and by transmitted light from either the front or back. Each of these three ways of scanning "sees," to varying degrees, the front, middle, and back layers of the multilayer film. By mathematically differencing the images seen in these three ways, all colors can be distinguished and, through color mapping techniques, can be assigned to the correct colors.

FIG. 1 presents a basic apparatus for electronic film development. A filmstrip 102 is placed under development by immersing the entire film in a transparent developing tank (not shown for clarity). During development, an infrared lamp 104 is switched on to illuminate a developing image 106 on the film. Light passing through the film 102 containing the image 106 is focused by lens 108 onto an area sensor array 110. At the same time, light reflected from the front of the film 102 containing the image 106 is focused by lens 112 onto an area sensor array 114. After the back transmission and front reflection images have been received by the sensor arrays 110 and 114 and stored in a computer memory, the lamp 104 is extinguished and the infrared lamp 120 is activated. With lamp 120 on, the sensor array 114 receives a front transmission image, and the sensor array 110 receives a back reflection image of the light from the film 102 containing the image 106. In the course of electronic film development, this process is repeated any number of times to receive multiple images made during development.

The problem with the apparatus of FIG. 1 is that only one frame can be developed at a time. The method also requires very precise placement of developer application to transition in the thin space between frames. Further, the method requires precise alignment of frames on a film before development is started. If a mistake is made in frame alignment, which is easy to do before any image has begun to develop, a seam will appear within a frame, ruining the image exposed in that frame. This hit or miss development is unacceptable for general use.

FIG. 2 presents a prior art refinement of an electronic film development apparatus. In FIG. 2, a filmstrip 202 is moved continuously to the right without requiring foreknowledge of frame boundaries. Developer is applied at station 204. At some time after application of developer, the film 202 will be positioned under line 206. At this line 206 the film 202 is scanned by two linear scan arrays: a front array 210 receives light imaged through lens 212, and a back array 214 receives light imaged through lens 216. In conjunction with front lamp 220 and back lamp 222, the front refection, back reflection, and transmission images can be received as described in FIG. 1.

In the apparatus of FIG. 2, sensor arrays 210 and 214 will always receive images of the film 202 at a specific development time fixed by the time of transport between the developer application station 204 and the line being scanned 206. A second scanning station viewing line 230, and a third scanning station viewing line 240 capture two additional images at two additional distinct times. Combined, the three scanning stations provide three views of the image in the film at three points in time.

Because of the ability to continuously move the film 202, the apparatus of FIG. 2 solved the problem of knowing frame boundaries before development. In fact, the entire film is developed seamlessly, with the assumption that further software can parse the continuous film image into separate frames.

The prior art apparatus of FIG. 2 has some serious disadvantages that severely limited the commercialization of electronic film development. The three scanning stations of FIG. 2 would cost on the order of three times that of the one scanning station of FIG. 1. Further, as explained above, an improved image would be obtained by scanning the image many more times than three. Although the apparatus of FIG. 2 could contemplate additional scanning stations, the cost would grow proportionately. Further, the line scanners of FIG. 2 require much more light than the area scanner of FIG. 1.

Another serious flaw in the apparatus of FIG. 2 is the problem in later aligning the images made at the different scanning stations. The image made along line 230 is scanned at a different development time from the image made along line 206, and therefore contains different image details. Because of the differences in these images, registration of these images in software was difficult and often done improperly since prior art software had difficulties aligning images with different sets of details. In response to the inability of software to align the images, the apparatus of FIG. 2 relied on expensive, precision mechanics for alignment, further increasing the cost. Electronic film development promised a universal film that could be used in conventional cameras and yet give unprecedented image detail as well as give a widened sensitivity range that would embrace the natural light of life without reliance on harsh electronic flash. The further promise of electronic film development was for a small development apparatus, with no plumbing, that could fit beside a desktop computer in businesses, schools, and homes to accelerate the image literacy revolution. The problems described above seriously compromised these dreams by making an electronic film development apparatus too expensive for families and schools to afford.

OBJECTS OF THE INVENTION

A primary object of this invention is to provide a simplified method of electronic film development.

A corollary object is to perform seamless scanning during film development with a single area scan station.

Another corollary object is to perform an arbitrary number of scans per film area with seamless coverage.

A further object is to perform seamless scanning at multiple times during development with a single linear array scanner.

Another object is to provide improved registration accuracy of the various scans made during the course of electronic film development.

A further object is to provide a nondiverging registration in electronic film development. Another object is to reduce computational time in registering the various scans made during the course of electronic film development.

SUMMARY OF THE INVENTION

These and other objects are accomplished in accordance with the teachings of this invention by scanning film in sequential areas that have multiple levels of overlap. The areas can be scanned by an area array or by a linear array rapidly moving so as to scan an area. The single scan area is iteratively moved with many levels of overlap to reduce the number of stations required by the prior art, thereby simplifying and lowering cost. The overlapping areas, in conjunction with other features of the present invention, prevent the seams created by the prior art method that used a single scanning station.

The scanned areas are accumulated in a film array representing the film. Each new area scanned is registered with the image already laid in the film array. This is made possible because the multiple levels of overlap insure that most of each new scan covers a part of the film previously scanned. In addition, the leading edge ahead of previous scans defines a region in which the registered new image can be warped to steer the growing image and prevent it from diverging out of the film array.

Registration is performed by first estimating, from previous scans, how the film looks at the time of a new scan, and then registering this new scan to this extrapolated estimate for increased accuracy. Once registered, the density from the new scan is accumulated in the film array as a set of parameter summations for later parametric regression of the density versus time curve for each pixel. Accumulation is weighted in a sparse fashion across the elements of the film array.

Front reflection, front transmission, back reflection, and back transmission scans are made at each time. The front and back transmissions are registered to each other, then the merged result is accumulated in a single transmission film array. The front and back reflection scans are assumed to be in perfect register with the front and back transmission scans, respectively, and therefore the registration data for the transmission scans also applies to the respective reflection scans, saving computation time.

ENABLING DESCRIPTION OF THE INVENTION

The basis of the present invention is now described with reference to FIG. 3. This basic description will leave issues of registration and overlap banding to be handled in reference to later illustrations. In fact part of the reason the basic description in FIG. 3 was not obvious in the prior art was that there was not a known solution for these associated problems.

Figure 3:
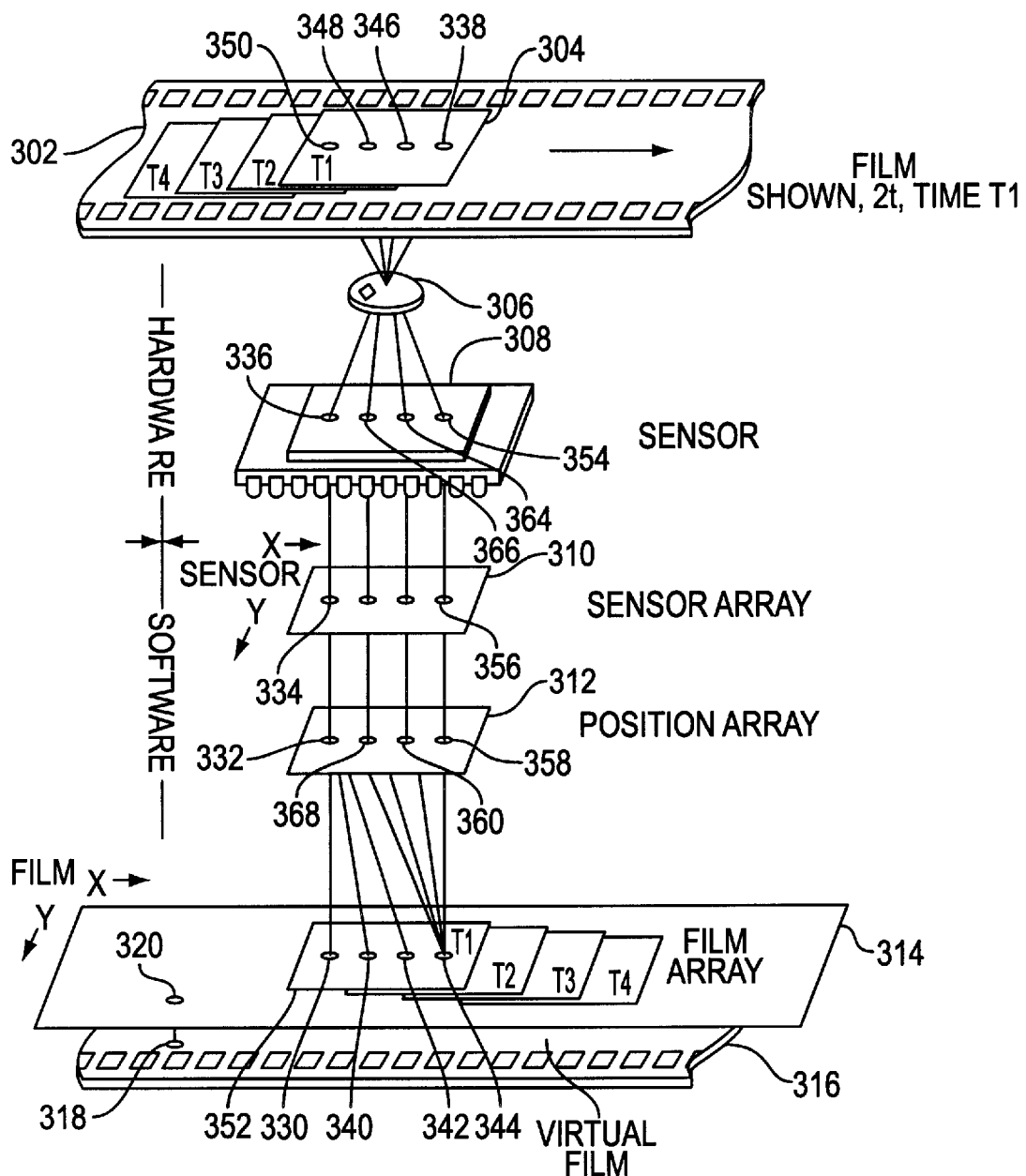
FIG. 3 presents a preferred embodiment of the present invention.

In FIG. 3 a filmstrip 302 advances to the right. An area of the film 302, such as area 304 representing the capture area at time T1, is imaged by lens 306 onto area sensor 308. As the film 302 advances to the right, the sensor 308 will be sequentially exposed to capture areas labeled T2, T3, and T4. The image impinging on area sensor 308 is digitized into discrete pixels and stored in cyberspace as elements of an array 310. A position array 312 matches to each pixel in array 310 an (x,y) position pair pointing to a spot in film array 314. The positioning pair may have fractional values and may point between actual pixels, or array elements, in the film array 314. Film array 314 seeks to match the original film 302, shown mirrored as virtual film 316, such that each point, such as point 318 in the virtual film 316, has a fixed point 320 in the film array 314 that remains fixed relative to the film 302 as the film 302 moves.

Any specific point in the film array 314, such as point 330, may be pointed to by any element in the position array 312. For example, at a first time T1, element 332 in the position array 312 points to point 330, thereby carrying element 334 in the sensor array 310 to point 330 in the film array 314. Sensor array element 334 is seen to map through sensor element 336 onto the film 302 at point 338. Similarly, points 340, 342, and 344 in the film array 314 map respectively to points 346, 348, and 350 on the actual film 302, such that block 304 in the film 302 maps to block 352 in the film array 314. For example, point 350 on the film 302 is seen by sensor element 354 in the sensor 308, has its density stored in element 356 of the sensor array 310, and is mapped by element 358 of the position array 312 to point 344 of the film array 314.

Point 344 in the film array 314 can be pointed to by any element in the position array 312. For example, at a second time T2, element 360 in the position array 312 holds the same (x,y) position numbers as element 358 did at time T1. Therefore, mapping through the sensor array 310, sensor element 364 of the sensor 308 will map to the same point 344 in the film array 314 as sensor element 354 did at time T1. Note that as the film 302 advances to the right, element 364 of the sensor 308 will view the same point 350 on the film 302 as did sensor element 354 at the first time T1. Similarly, as the film 302 continues to move right, point 350 on the film 302 will be focused by lens 306 on, sequentially, sensor elements 354, 364, 366, and 336 of the sensor 308. Therefore, in the position array 312, the same numerical (x,y) position numbers will appear sequentially at elements 358, 360, 368, and 332, to carry the same point 350 on the film 302 to the same point 344 in the film array 314 despite movement of the film 302 and subsequent change in the position on the sensor 308 at which the point 350 is measured.

Figure 1:
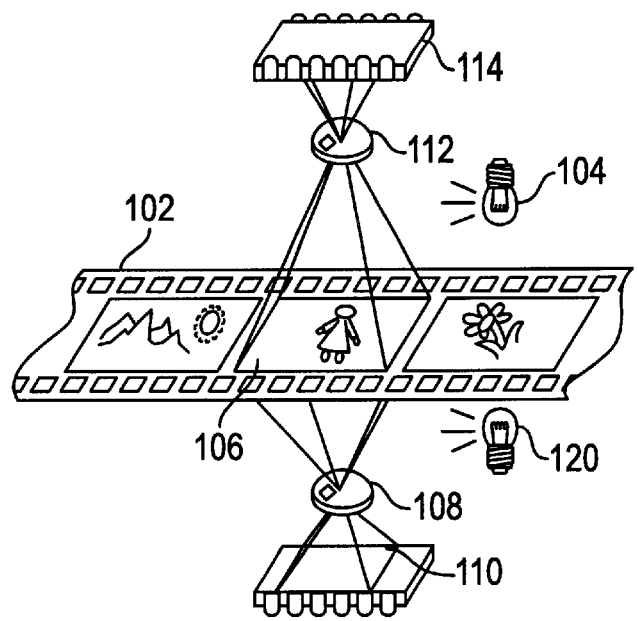
FIG. 1 illustrates the prior art of electronic development.

The basic principle of the invention is to sense a region of the image at each frame of time in order to provide the advantages of the prior art apparatus of FIG. 1; namely, the ability to make many samples of each point on the film as a function of time with only a single scanning station. Furthermore, the invention combines incremental movement with each scan to also provide the advantages of the prior art apparatus of FIG. 2; namely, the elimination from major seams between individually developed frames, and the corresponding need to guess frame boundaries before any image is visible.

The area as described can be scanned with an area array 308 as illustrated in FIG. 3. An area array typically consists of a two-dimensional array of sensors. However, as is well known, an area can also be scanned by a linear array that is moved rapidly in a cross scan direction perpendicular to the one-dimensional line in which the individual sensors are arranged. The time it takes to perform this cross scan must of course be less than the time difference between the times individual areas are scanned at times T1 to T4. If the scan time approaches this time, then the areas diverge from rectangles and become parallelograms. This distortion can, however, be removed by correcting the position array 312 so as to map the sensor array 310 to the film array 314 such that the mapping to the virtual film 316 reflects the actual parallelogram area scanned on the real film 302. This correction process is described in more detail below.

Figure 2:
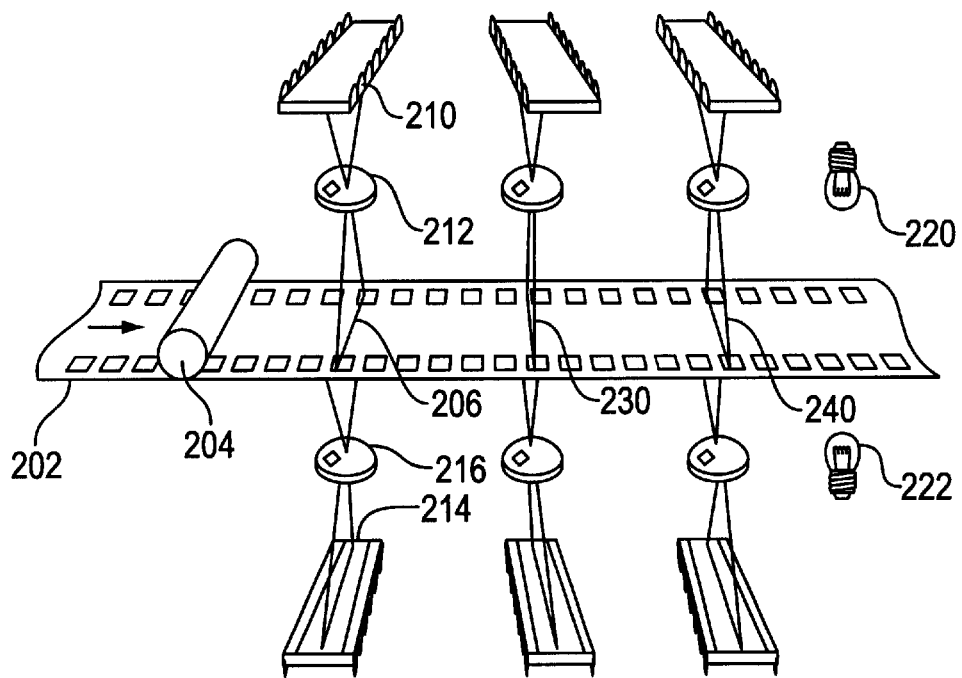
FIG. 2 illustrates an improved prior art method of electronic film development.

The additional components needed to make the invention even more practical are a method of registration that will succeed where the prior art using the apparatus of FIG. 2 failed, and a method of avoiding faint seams between each minor advance of the sensing area. These components will be disclosed with reference to later illustrations.

Figure 4:
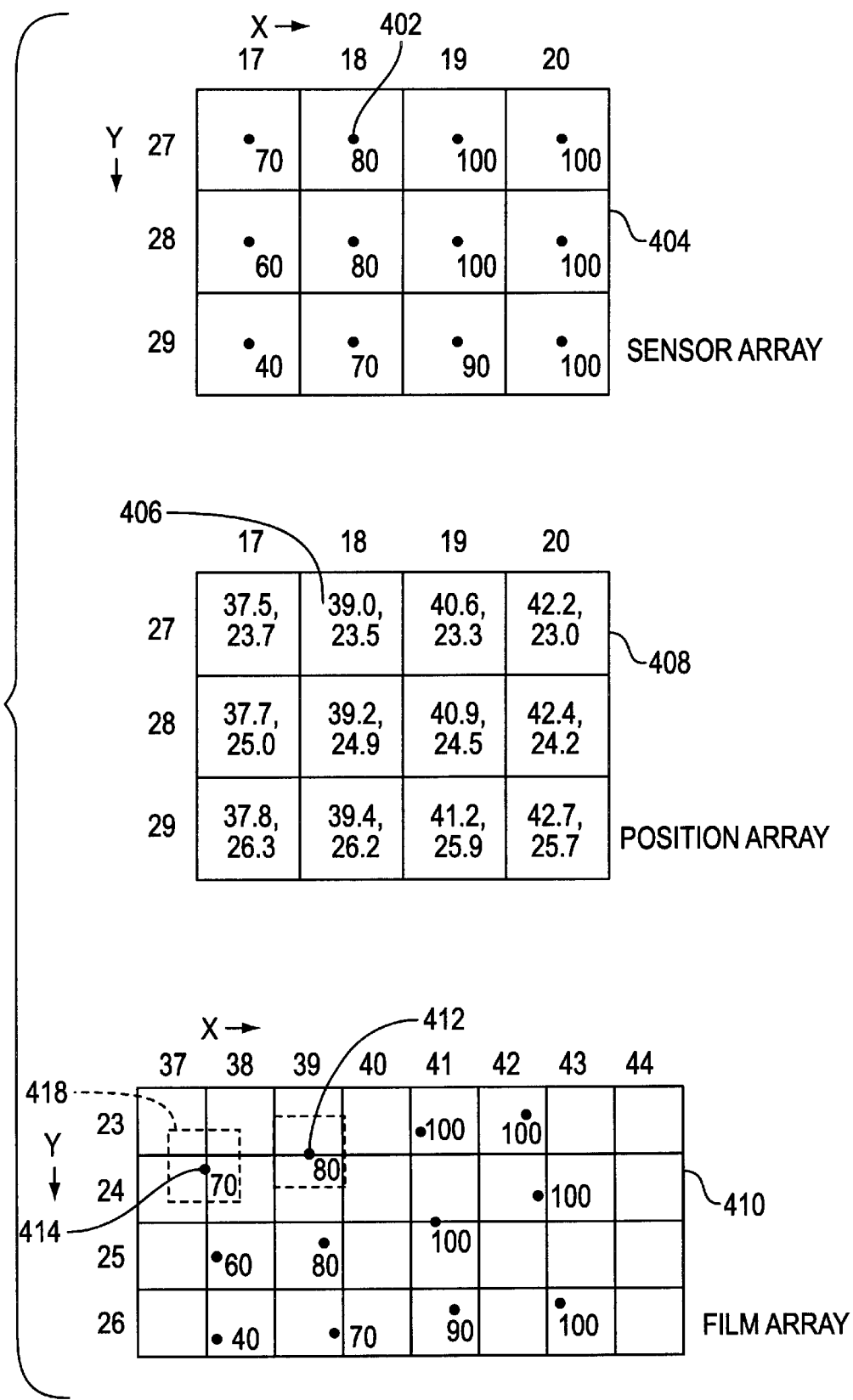
FIG. 4 details the use of a position array in sparse mapping.

FIG. 4 explains in more detail how the position array maps specific elements in the sensor array into the film array. In the specific numerical example of FIG. 4, element (18, 27), also called element 402, of the sensor array 404 contains the measured density value 80. Element (18,27), also called element 406 of the position array 408, maps this density data of 80 to location (39.0,23.5) in the film array 410. When so mapped, element 402 of the sensor array 404 materializes in the film array 410 at position 412, which is seen to be midway between discrete elements (39,23) and (39,24).

A problem now arises as to how the density data is to be copied into the film array. A simple resize, commonly used in the art, will give suboptimal results. As a preferred embodiment of this invention, a "sparse resize" is done, as is now defined. In a sparse resize, a mapped element block the size of a pixel block in the film array 410 is conceptually drawn around each mapped element, such as element 412, and the data of that element added to each pixel in the film array 410 in proportion to the degree of overlap of that pixel's block with the mapped element block. In the specific case of element 412, half the data would go to film array element (39,23), and half to element (39,24). In the specific case of element 414, seen from element (17,27) of the position array 408 to map to position (37.5,23.7) in the film array 410, 15% weighting would go to element (37,23), 15% to element (38,23), 35% to element (37,24), and 35% to element (38,24), each in proportion to the overlap of block 418 with the respective pixel of the film array 410.

The nomenclature "sparse resize" emphasizes that the weighting is not uniform. Suppose that the mapping was very sparse such that many pixels of the film array 410 were skipped between mapped pixels from the sensor array 404. In this case, there could be elements of the film array 410 that were not advanced at all with any individual scan. It is then hoped that other scans, whether by randomness or purposeful interlace, will fill in those empty data points in the film array. To the extent all the points get filled through multiple scans, the advantages of a dithered, or interlaced, sparse sensor array are realized; namely, vernier resolution is increased beyond the actual pixel spacing limits of the sensor array.

Even where there are insufficient scans, or where randomness or purposeful interlacing have failed to adequately fill all the elements in the film array, the deficient elements of the film array can average data from adjacent elements with no worse resolution loss than if the sensor array had been mapped to the film array through a conventional resize.

Further, in order to later practice a technique called parametric stitching, the data accumulated in each element, or pixel, of the film array should be derived parameters from the sensor array data. For example, each element of the film array may consist of four parameters. The first parameter might be a running summation of the total weighting of all elements from the sensor array applied to that pixel, the second may be a running summation of that total weight times the density from the sensor array pixel, the third may be a running summation of that weight times the density times the time the density was measured, and the fourth may be the running summation of that weight times the density times that time squared.

A method for registration of the images will now be discussed, and in particular a solution to registering images made at different development times will be presented. The solution is enabled by a technique called parametric stitching, which will now be discussed with reference to FIGS. 5 and 6.

Figure 5:
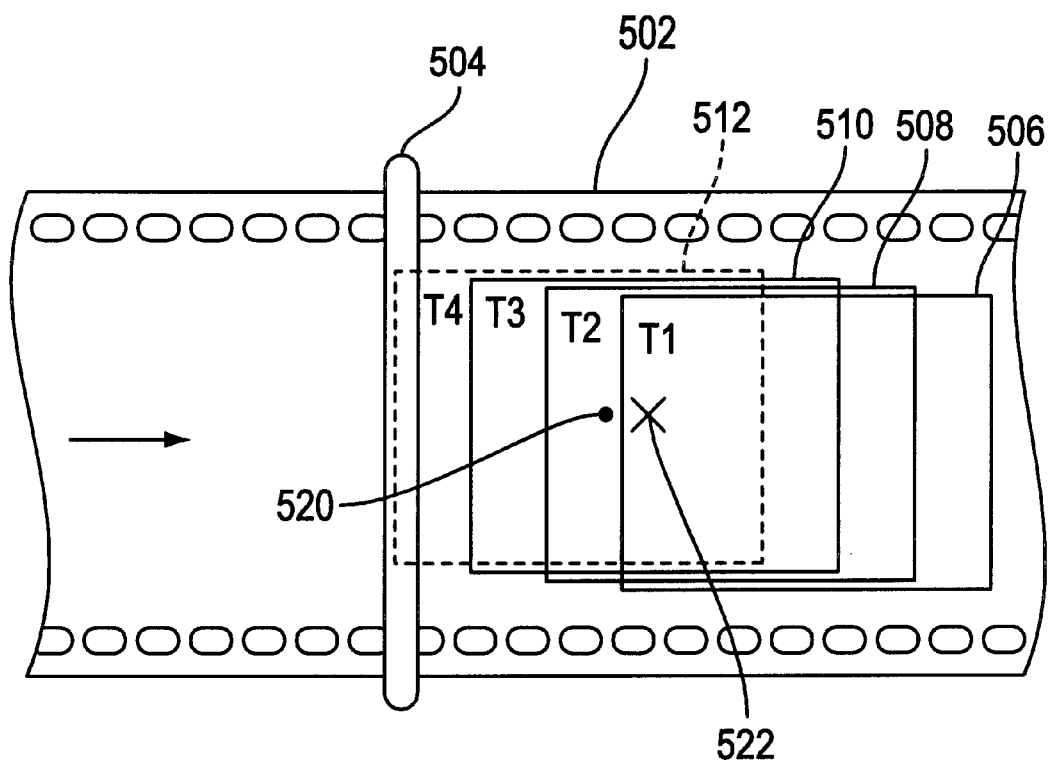
FIG. 5 shows a progression of scans across two points.

In FIG. 5, a piece of film 502 moves continuously to the right under developer application module 504. Several time scales will be used in describing this process. Absolute time can be used to specify the time a scan is made. For example, area 506 was scanned at time T1, area 508 was scanned at time T2, and area 510 was scanned at time T3. Another time scale is the time of development. Because developer is applied at station 504 and the film moves at a constant speed to the right, the development time is proportional to the distance between the developer application station and any arbitrary point at the moment that point is scanned. For example, the entire area 510 is scanned at time T3, but two points in the region, point 520 and point 522, will each have received a different development time at the instant of scan. Point 520 will be referred to as the dot point, and point 522 as the x point.

The problem at hand is that area 512, shown by dotted lines, is just being scanned at time T4, and it will be necessary to spatially register this new scan with the previous scans. As explained in the background section, the special problem is that, because this scan occurs at a later time than any of the other scans, it does not match any earlier scan, making registration difficult.

Figure 6:
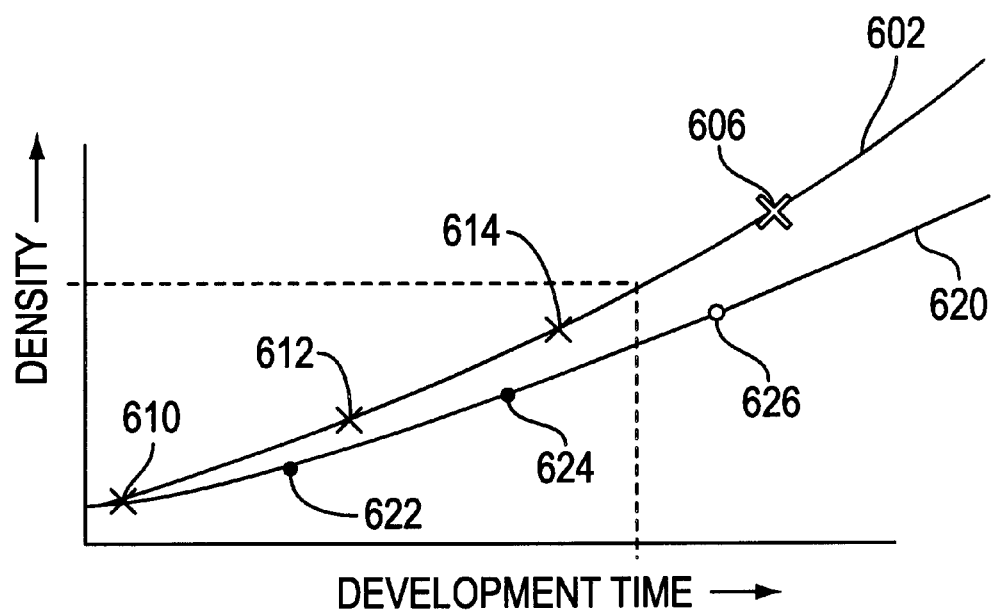
FIG. 6 shows parametric regression with the points in FIG. 5.

FIG. 6 shows a curve 602 representing density versus development time for film exposed to a constant light. Assume the x point 522 received this exposure. At time T4 the new, as yet unregistered, scan will see the x point at time-density 606. The problem is to extrapolate, from existing scans, a scan that does in fact match this density so as to facilitate registration. The x point is measured at time T1 to be at time-density point 610, at time T2 to be at time-density point 612, and at time T3 to be at time density point 614.

Note that all the x points lie on the common density curve 602. This curve 602 can be described parametrically as, for example, $A+Bt+Ct^2$. A best fit curve 602 is found through all the x points, and extrapolated to density 606 at the development time at which the x point is scanned, here at time T4. Thus at the x point the image scanned at time T4 can be given a registration target that is a good estimate of the actual image, and registration is thereby facilitated.

Also note that all the dot points lie on another common density curve 620 defining the exposure of the dot point 520. The dot point 520 is outside the scanned area at time T1, but is inside a scanned area at time-density point 622 at time T2 and at time-density point 624 at time T3. From these points, regression mathematics give an estimation 626 for the density of the dot point at the development time scanned at time T4, giving the image at T4 a matching target with which to register.

Figure 7:
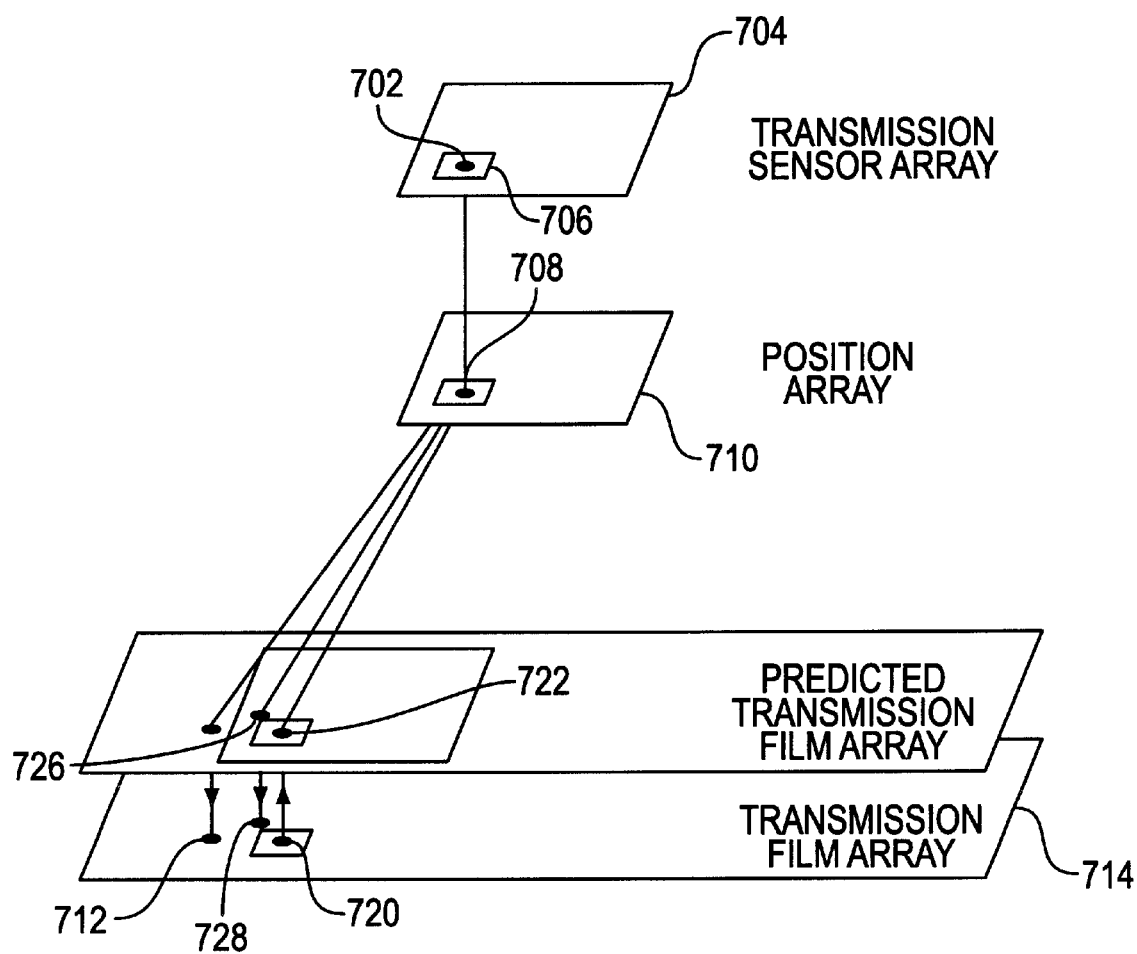
FIG. 7 portrays the improved registration method of the present invention.

FIG. 7 summarizes the registration process at a higher level. A pixel 702 in transmission sensor array 704 is surrounded by a small region 706. Pixel 702 is mapped by the (x,y) coordinate at coincident location 708 in the position array 710 to point 712 in the transmission film array 714. At a later time, another scan is made, and it is necessary to register this new scan to the data already in the transmission film array 714. Only after the new scan is properly registered can it be added to the accumulating data in the transmission film array 714. If it were to be added out of register, the resultant image would appear smeared.

In order to accomplish registration, several steps are necessary. First, an estimate is made, based on dead reckoning using film speed and time between scans, that the new mapping will place pixel 702 at point 720 in the transmission film array. To practice dead reckoning, the film velocity is multiplied by the time between scans, and the resulting displacement vector added to the previous scan area to estimate where the new scan area will locate. To test the accuracy of this estimate, and to correct any errors, the parameters at point 720 are extrapolated to estimate the density at the time of the new scan. The parameters of all points around point 720 are similarly extrapolated to produce predicted point 722 and the predicted region around point 722. Now the image and region around it projected from point 702 through position array 710 is registered with the predicted point 722 and the region around it. A registration process known in the art finds the cross correlation between the two images at a number of small incremental offsets. The offset giving the highest cross correlation is the best estimate of the optimal registration position. For example, it may be found that point 702 should actually map to point 726, rather than point 722, because, for example, the mechanical transport was slightly misaligned. As the final step in this process, the data at pixel 702 is added to the transmission film array at point 728.

FIG. 8 points to a problem which occurs when simply registering new scans to existing scans, and presents a solution. The problem is similar to the steering problem in a car in which an assumption is made that if the car starts out aimed in the right direction, and the steering is correctly aligned, that no steering is needed to reach a destination. The solution adds a steering feedback to the registration process.

Figure 8A:
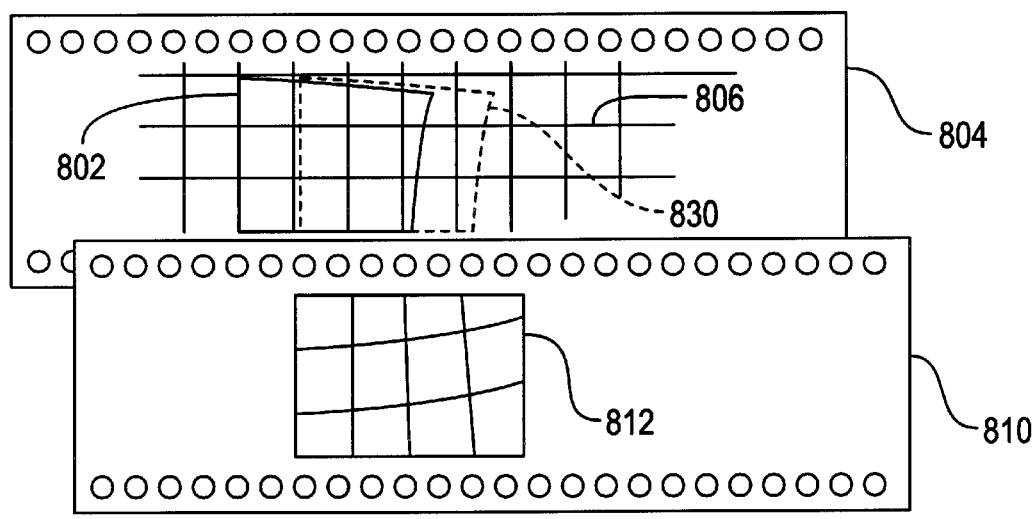
FIG. 8 illustrates registration drift and steering.

In FIG. 8a, an area 802 of a film 804 is scanned. Due to optical and mechanical misalignments, the scan is not square, and therefore imaginary square gridlines 806 in the image will be written to the film array 810 skewed as shown if the image array outline itself is written to the film array initially as a perfect rectangle 812.

Figure 8B:
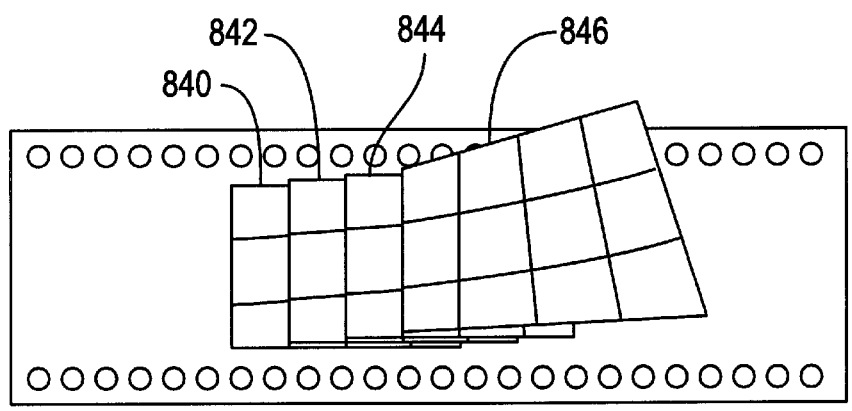

The next scan may cover region 830 on the film. When this is registered to the emerging image 812 in the film array 810, it will begin to diverge, like an automobile with misaligned steering. The effect after several iterations is seen in FIG. 8b to be a divergence in position on the film and in magnification. In FIG. 8b, the first scan was laid into the film array at block 840. The next was overlaid in register at block 842, the next overlaid block 842 at block 844, and the next overlaid block 844 at diverging block 846, each building on and compounding the misalignment of the previous. Although the misalignment illustrated in FIG. 8 may be considered extreme, it is apparent that even good alignment can rarely pass an entire film without running off the edge of the film array.

Figure 8C:
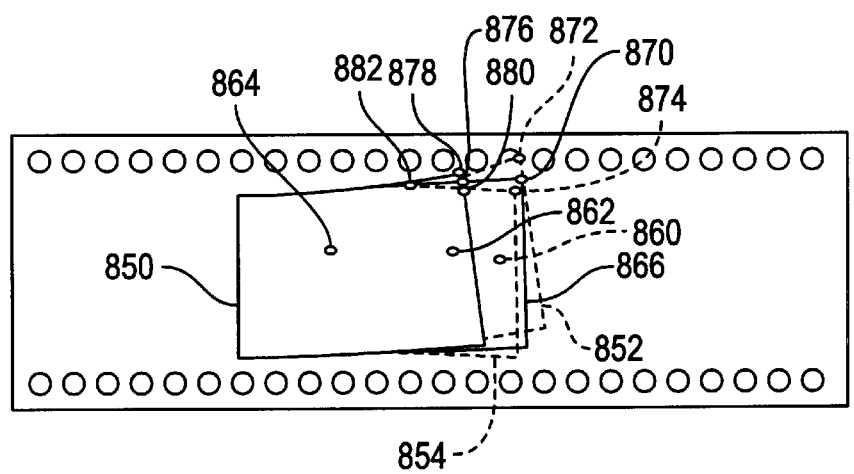

The steering needed to maintain alignment is illustrated in FIG. 8c. A block from a particular scan is shown as block 850. A next block containing a subsequent scan could be placed at location 852 if the image is registered, but, as seen above, this will lead to widening divergence. Alternatively, the next block could be positioned at location 854 based on dead reckoning. The dead reckoning positioning will never diverge or change magnification; however, to the extent the image is misaligned, it will overlay multiple images out of register, blurring the images. A solution is discovered by noting that there is a region around point 860 for which the new scan sees the film for the first time, and there is no previous image. In this region the registration based on extrapolation of the best fit can be warped in any way without affecting blurring. Subsequent images will then track the new warp. There is also a region around point 862 for which only a weak previous image existed, and any warpage from the best fit will result in only a small blurring in this region. Finally, there is a region around point 864 for which the image has been well established with multiple previous scans, and no warpage is tolerable. Note that the most serious divergence occurs at the leading edge in the region around point 860, for which any correcting warpage is tolerable.

Therefore, the solution is to select a block 866 between the best fit registered block 852 and the dead reckoned block 854. In particular, in the region around point 860, the bias will be toward the dead reckoning block, blending smoothly to be near the registered block in the region around point 862, and finally blending to exactly align to the registered block 852 in the region around point 864. For example, point 870 at the leading edge is biased farthest from the best fit registered point 872 toward the dead reckoned point 874, while point 876 at the transition region is biased strongly toward the best fit registered point 878 away from the dead reckoned point 880, and point 882 lies directly on the registered point. This method is seen to provide a steering feedback at the leading edge that guides the leading edge back to nominal magnification and position. Further improvements can include integral feedback and damping techniques known in the art of feedback.

Finally an overall electronic film process will be described with reference to the present invention using FIG. 9. The relationships between registrations of the front reflection scan, back reflection scan, and two transmission scans will be described.

Figure 9:
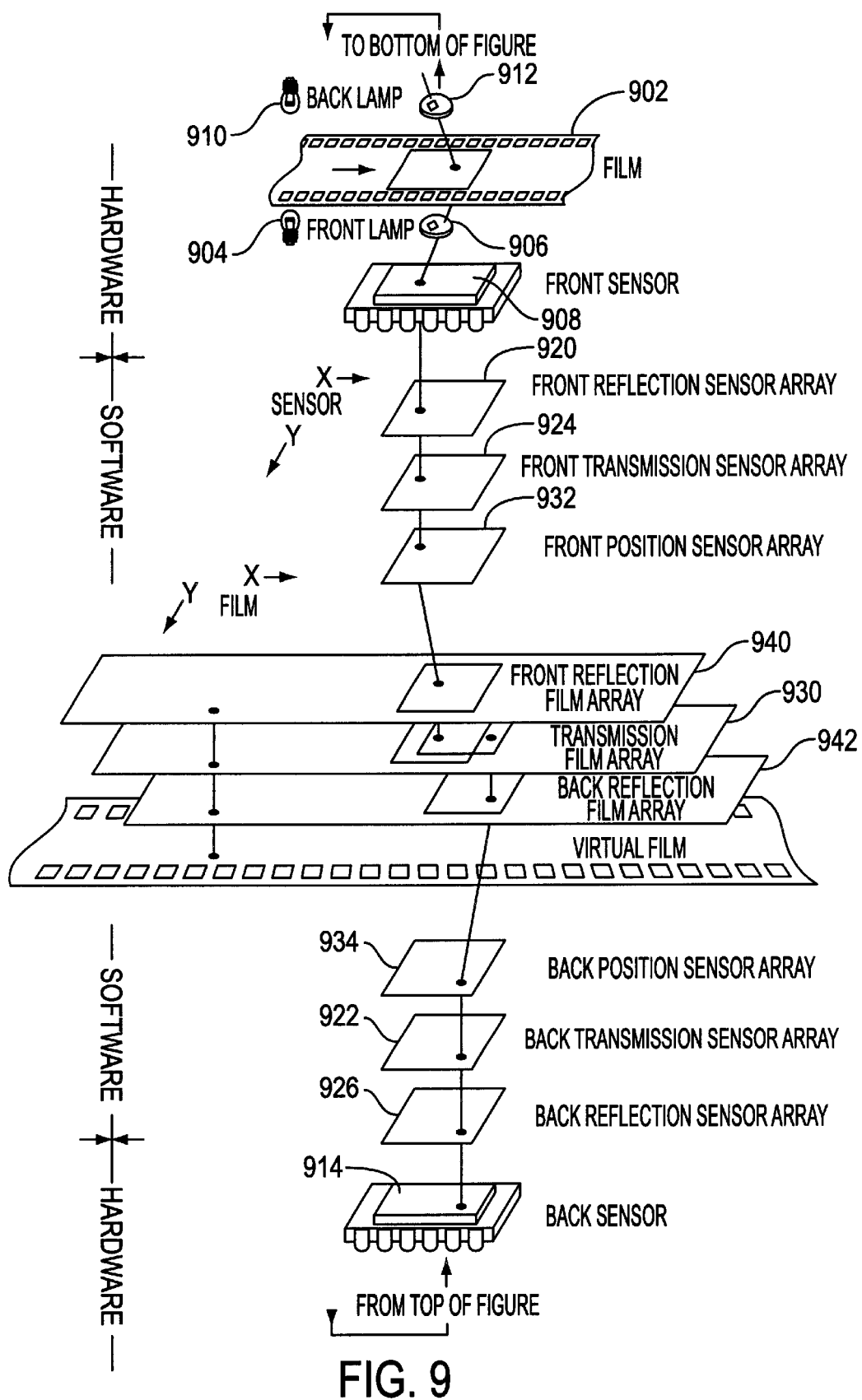
FIG. 9 is an overall view of the present invention illustrating coregistrations.

In FIG. 9, a filmstrip 902 under development moves to the right. A front lamp 904, front lens 906 and front sensor 908, in conjunction with a back lamp 910, back lens 912, and back sensor 914 (at the bottom of the figure), in concert receive the front reflection, front transmission, back reflection, and back transmission scans in the manner described previously with reference to FIG. 1.

The front reflection scan made with the front sensor 908 and front lamp 904 is placed in the front reflection sensor array 920. At the same time, the light from lamp 904 used to illuminate the front reflection scan can be used in conjunction with the back sensor 914 to illuminate the back transmission scan and that scan placed in the back transmission sensor array 922. Within a time so short the mechanical movement of the film is much less than a pixel, the front lamp 904 is extinguished and the back lamp 910 is activated to illuminate the front transmission scan and back reflection scan, receive these scans through sensors 908 and 914 respectively, and place these scans in respectively the front transmission sensor array 924 and the back reflection sensor array 926.

Next, the front transmission sensor array 924 will be registered to the transmission film array 930 through the front position sensor array 932, and the image added to the transmission film array 930, using the technique previously disclosed with reference to FIG. 7. Next the back transmission sensor array 922 is similarly registered through the back position sensor array 934. Registration can be to the same transmission array 930 because the front transmission and back transmission scans see effectively the same transmission image embedded in the film 902. The differences in brightness between the front and back sensors must be corrected if the same array 930 is used to collect the regression statistics. This correction may be based on equalizing overall averages, or may be done as described below.

It should be noted that if the scans were all made at virtually the same time as described before, then the two transmission arrays 922 and 924 will always bear a constant mechanical misregistration with each other, in addition to a very small variable misregistration due to film warpage away from one lens 912 and toward the other lens 906, which may be minimized by selecting telocentric lenses. Thus, once the constant mechanical misregistration is known by performing a mutual registration, it can be applied to the result of registering the front transmission sensor array 924 to the transmission film array 930 to obtain a very close estimate of the registration of the back transmission sensor array 922 to the same transmission film array 930 without actually performing the second registration using cross correlations, thereby halving the needed amount of cross correlations.

A further embodiment of this method first registers the back transmission sensor array 922 to the front transmission sensor array 924. Because the two arrays are primarily misregistered by a constant mechanical misalignment, it is not necessary to actually calculate the registration with cross correlations for each time, but only periodically to check the accuracy of the constant registration data stored in memory. From the known registration data, the two arrays are combined, or added, to compose a single transmission array. This can be done by resizing the back transmission sensor array 922 to match in registration the front transmission sensor array 924, and then adding the resized data directly to the front transmission sensor array 924. This method obviates any overall density differences between the front and back transmission arrays because only the single sum will subsequently be used to register to and accumulate to the transmission film array 930.

Note again that, if the scans were all made at virtually the same time as described before, then the two front arrays 920 and 924 are mutually in register and can share the same front position sensor array 932, and therefore the front reflection sensor array 920 maps through the shared front position sensor array 932 to update the front reflection film array 940. Since this front position sensor array 932 has been calculated for the front transmission sensor array 924, there is no need to do any cross correlation with the front reflection sensor array 920. This is an advantage because the transmission image captures all three color layers with better image clarity, and therefore allows the more accurate registration based on cross correlation.

Similarly, the two back arrays 922 and 926 are mutually in register, and will share the single back position sensor array 934, and therefore the back reflection sensor array 926 maps through the shared back position sensor array 934 to update the back reflection film array 942. Thus, all four arrays 920, 922, 924, and 926 are registered with only a single prediction step, and only two registration steps, where one of the registration steps may be greatly simplified.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the spirit and scope of the invention as set forth in the claims recited below.

What is claimed is:

1. A method of obtaining a plurality of registered images that can be used to obtain an image during electronic development of a film using a scan station, comprising the steps of:

commencing development of the film;

scanning a first area of the film containing an image with a scan station during a first stage of the film's development and generating a first scan representing aspects of the image developed during the first stage of development;

moving the film relative to the scan station; and scanning a second area of the film with the same scan station utilized for scanning the first area of the film at a second stage of the film's development and generating a second scan representing aspects of the image present during the second stage of development, the second area of the film at least partially overlapping the first area and including at least a portion of the first area of the film.

2. The method of claim 1, wherein the scan station comprises an area sensor.

3. The method of claim 1, wherein the scan station comprises a linear sensor and a motive force to drive the linear sensor across the film so as to scan the first area on the film during the first time.

4. The method of claim 1, further comprising the steps of:
adding the first scan to a film array; and
registering the second scan to the film array.

5. The method of claim 4, wherein the registering step comprises estimating a scannable appearance of the film at the second time from the contents of the film array.

6. The method of claim 4, wherein the adding step comprises generating parametric summations from the first scan.

7. The method of claim 4, wherein the first scan is comprised of pixels, and the adding step comprises the steps of:
reading a pointer to a point in the film array for a pixel in the first scan; and
weighting an addition of a value of that pixel to an element of the film array, the element being proximal to the point in proportion to an overlap of that element and a comparable area that is centered on the point.

8. The method of claim 4, wherein the registering step comprises the steps of:
estimating a registration of the first scan to the film array to determine an estimate of the registration of the first scan; and
conducting a registration of the second scan within a reduced area around the estimate of the registration of the first scan.

9. The method of claim 8, wherein the conducting step comprises deriving a crosscorrelation of a region of the first scan and a region of the film array.

10. The method of claim 4, wherein the registering step comprises the steps of:
generating a register estimate based on dead reckoning; and
biasing the second scan toward the register estimate in a region of the film array to which earlier scans have not been added.

11. The method of claim 4, wherein the second scan comprises a second front transmission scan and a second back transmission scan, which are each registered to the film array.

12. The method of claim 11, further comprising the step of adding the second front transmission scan and the second back transmission scan to the film array.

13. The method of claim 4, wherein the second scan comprises a second front transmission scan and a second back transmission scan, and the method further comprises the steps of:
selecting one of the second front transmission scan and the second back transmission scan as a first array;
registering the first array to the film array;
registering a remaining array of the second front transmission scan and the second back transmission scan to the first array;
combining the remaining array with the first array to form an augmented first array; and
adding the augmented first array to the film array.

14. The method of claim 4, wherein the second scan comprises a second front transmission scan and a second front reflection scan, and the second front reflection scan is registered in a way substantially the same as the second front transmission scan.

15. A method of obtaining a plurality of registered images that can be used to obtain an image during electronic development of a film using a scan station, comprising the steps of:
commencing development of the film;
generating a plurality of temporally separated scans by scanning operations on the same scan station of the film to electronically capture aspects of a image on the film present at the times of the scans;
moving the film between successive scanning operations; and
registering the scans to a film array, wherein the film array represents a virtual film that characterizes the film, and two successive scans include an overlapping portion that corresponds to an overlapping area of the film.

16. The method of claim 15, wherein the overlapping area includes at least half of a first scan of two successive scans.

17. The method of claim 15, wherein the scan station comprises an area sensor.

18. The method of claim 15, wherein the scan station comprises a linear sensor and a motive force to drive the linear sensor across the film so as to scan the film.

19. The method of claim 15, wherein the registering step comprises estimating a scannable appearance of the film from the contents of the film array.

20. The method of claim 15, wherein the registering step comprises the steps of:
estimating a registration of a previous scan to the film array to determine an estimate of the registration of the previous scan; and
conducting a registration of a current scan within a reduced area around the estimate of the registration of the previous scan.

21. The method of claim 20, wherein the conducting step comprises deriving a crosscorrelation of a region of the previous scan and a region of the film array.

22. The method of claim 15, wherein a current scan comprises a current front transmission scan and a current back transmission scan, and the method further comprises the steps of:
selecting one of the current front transmission scan and the current back transmission scan as a first array;
registering the first array to the film array;
registering a remaining array of the current front transmission scan and the current back transmission scan to the first array;
combining the remaining array with the first array to form an augmented first array; and adding the augmented first array to the film array.

23. The method of claim 15, wherein a current scan comprises a current front transmission scan and a current front reflection scan, and the current front reflection scan is registered in a way substantially the same as the current front transmission scan.

24. A system for obtaining a plurality of registered images that can be used to obtain an image during electronic development of a film, comprising:
a development applicator that applies a developer to a film to be developed;
an illumination source for illuminating the developing film;
a sensor for receiving an image from the developing film when it is illuminated by the illumination source and producing sensor array data; and
a computer for processing the sensor array data to obtain registered sensor array data, the sensor array data being registered according to a mapping specified by a position array.

25. The system of claim 24, wherein the mapping provides a consistent registration for registered images taken from overlapping areas of the film.

26. The system of claim 24, wherein the mapping relates the sensor array data to a virtual film that characterizes the film.

27. A method of obtaining a plurality of registered images that can be used to obtain an image during electronic development of a film using a scan station, comprising the steps of:

scanning a first area of a film containing an image with a scan station during a first time during development to generate a first scan;

moving the film relative to the scan station;

scanning a second area of the film at a second time to generate a second scan wherein the second area of the film includes at least half of the first area of the film;

adding the first scan to a film array by generating parametric summations from the first scan; and registering the second scan to the film array.

* * * * *